July 4, 1944. W. D. BELL 2,352,762
APPARATUS FOR SEALING CONTAINERS
Filed April 8, 1939 4 Sheets-Sheet 1
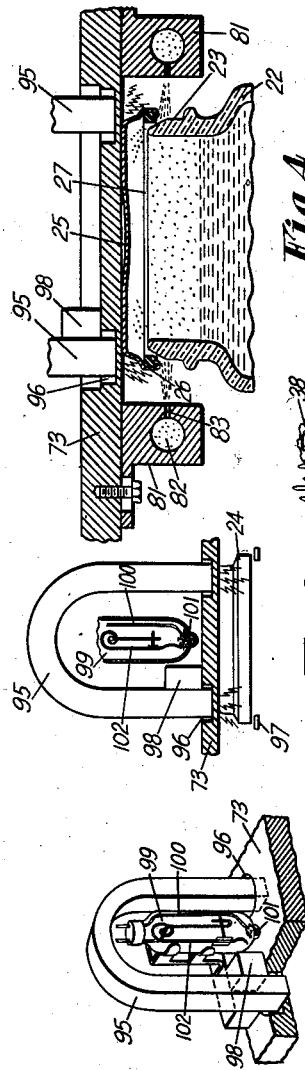
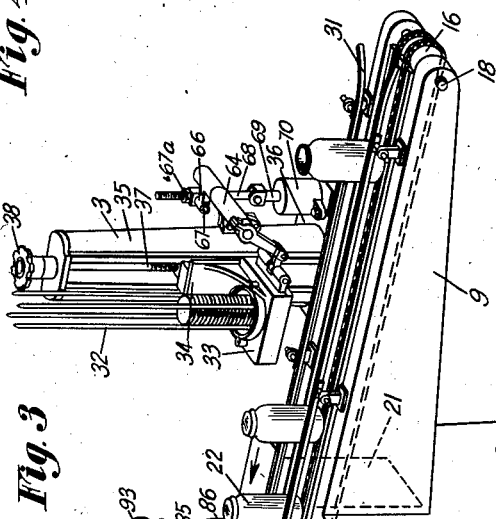
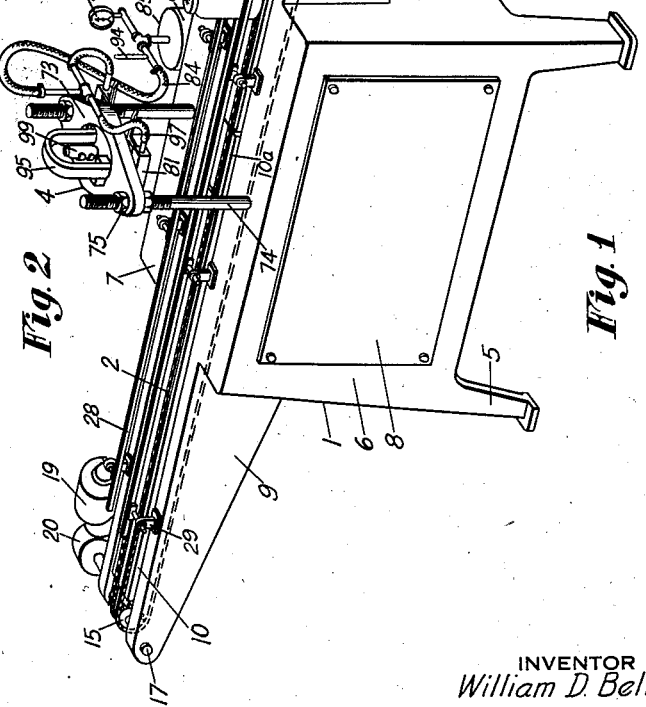
INVENTOR
William D. Bell.
BY
ATTORNEYS INVENTOR
William D. Bell.
BY
ATTORNEYS

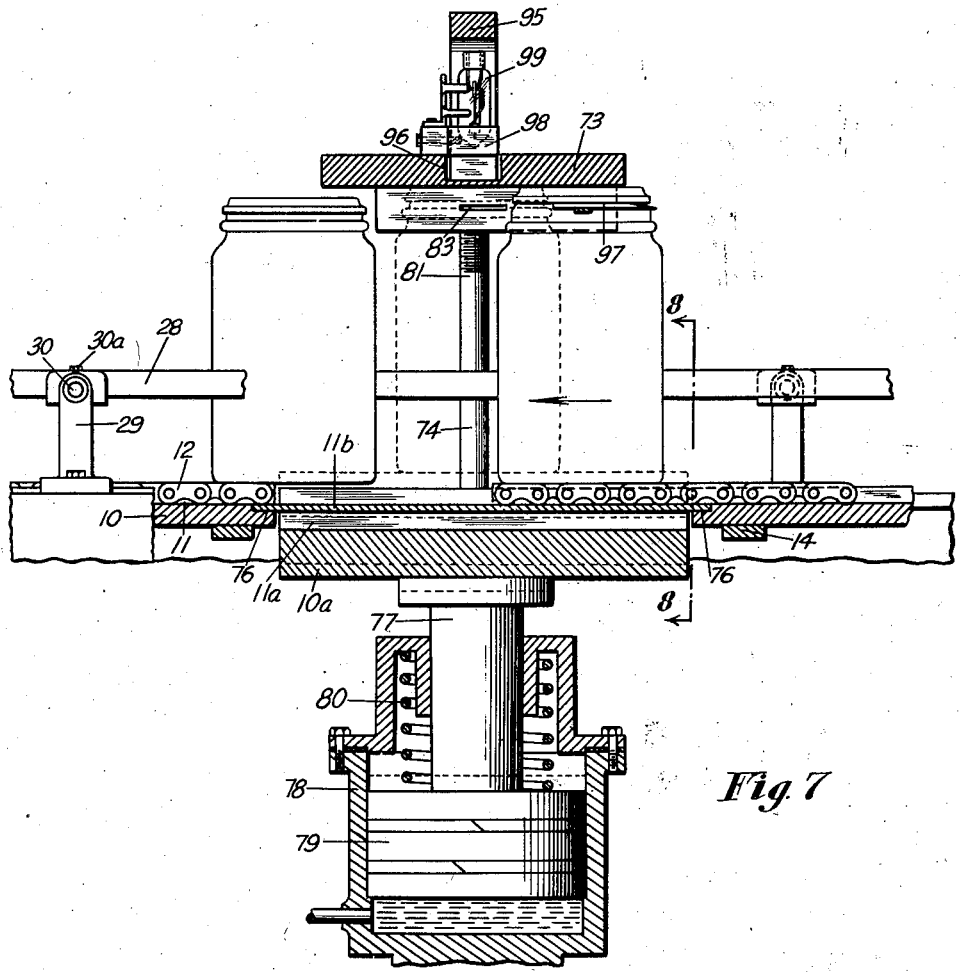
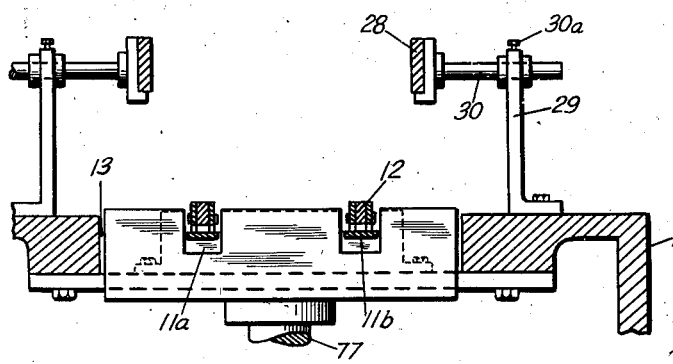
Fig. 7
Fig. 8
INVENTOR
William D. Bell.

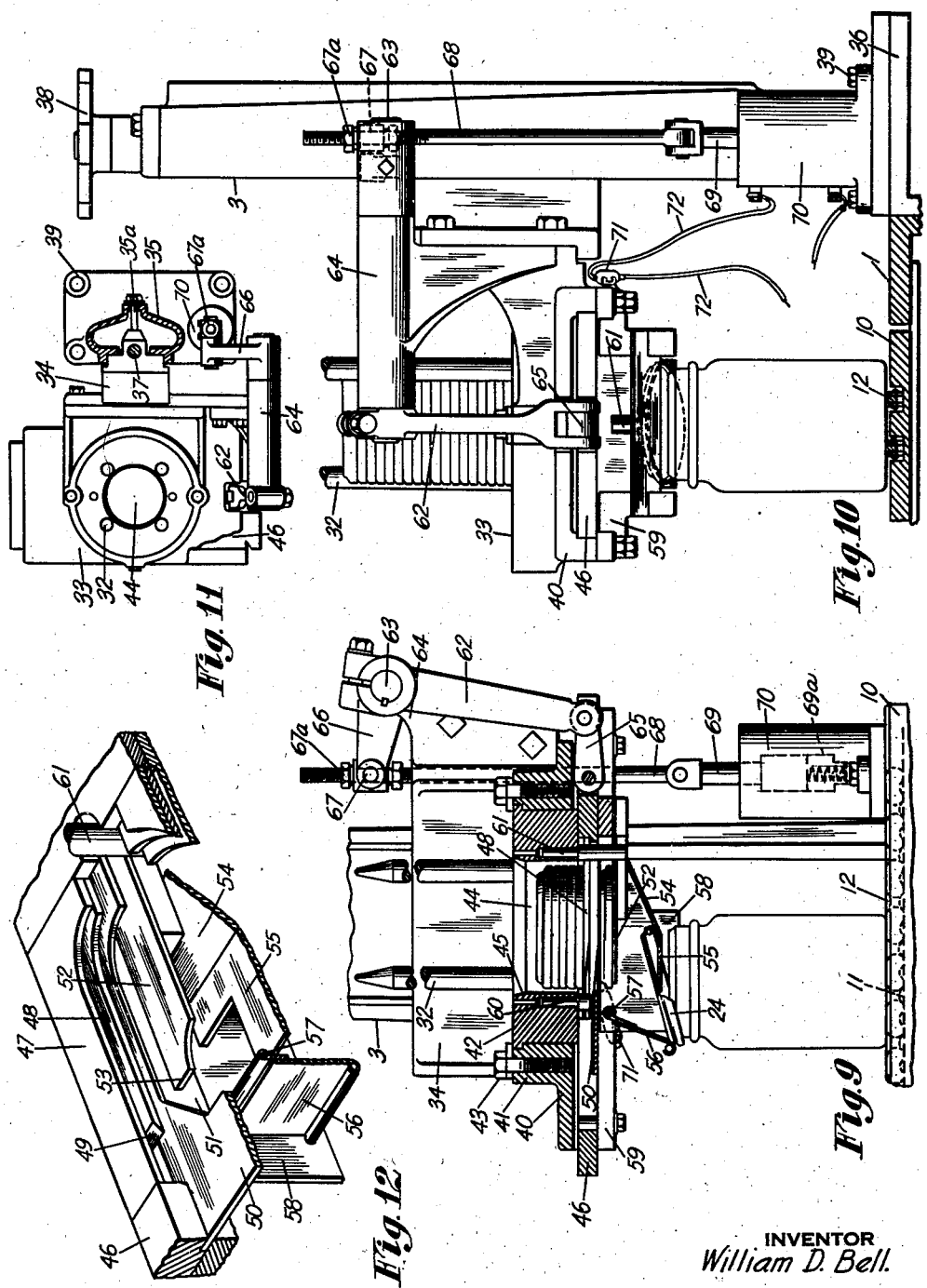

Patented July 4, 1944

2,352,762

UNITED STATES PATENT OFFICE 2,352,762

APPARATUS FOR SEALING CONTAINERS

William D. Bell, Columbus, Ohio, assignor to Anchor Hocking Glass Corporation, Lancaster, Ohio, a corporation of Delaware Application April 8, 1939, Serial No. 266,914

19 Claims. (Cl. 226—82)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

One of the objects of my invention is to provide a greatly simplified apparatus for applying and sealing closures on containers and for creating an effective vacuum in the space at the upper end of the container between the closure and the contents of the container which will aid in preventing spoilage of the contents and will also aid in keeping the closure in position on the container.

Another object of my invention is to provide an apparatus of the type indicated which is of such a nature that the closure and upper end of the container and the head space between the contents and the closure will be sterilized during the sealing operation.

Another object of my invention is to provide an apparatus of the type indicated which will vacuumize and seal the container quickly and effectively.

Another object of my invention is to provide a machine of the type indicated which is of a very simple structure and, therefore, can be built at a relatively low cost, which will occupy a small amount of space, and which is composed of a minimum number of parts tending to wear or become inoperative.

Another object of my invention is to provide a machine of the type indicated which may be readily adjusted to operate upon containers of various sizes.

Another object of my invention is to provide a machine of the type indicated which will automatically adjust itself to containers varying in height to a limited degree.

Another object of my invention is to provide a machine which will be continuous in operation and which will perform its operations without handling of the containers by an operator.

In its preferred form my invention contemplates the provision of a simple apparatus for applying closures to and sealing them on various containers such as jars, bottles, cans, etc. With my apparatus, the filled containers are placed indiscriminately on a continuous moving conveyor. During the movement of the containers by the conveyer, caps or other closures are loosely positioned on the upper ends of the containers. Means is provided in association with the conveyer for centering and maintaining the containers centered on the conveyer. The containers are then moved to a point where a sealing head is disposed. This sealing head is spaced slightly above the upper ends of the containers. At this point, there is also provided means for lifting each container from the conveyer until the cap thereon contacts with the sealing head and the cap is forced into frictional engagement with the upper end of the container. The sealing head is provided with means which will automatically lift the cap from the upper end of each container, and inject steam into the head space at the upper end of each container, both of these operations being performed substantially simultaneously just prior to the sealing of the cap on the container. After the cap is sealed on the container, the steam previously injected into the head space of the container will condense, creating an effective vacuum within the container which will aid in holding the cap in position and will also aid in preventing spoilage of the contents of the container.

Various other objects and advantages will be apparent from the following description.

The preferred embodiment of my invention is illustrated in the accompanying drawings wherein similar characters of reference designate corresponding parts and wherein:

Figure 1 is a perspective view illustrating a machine constructed in accordance with my invention.

Figure 2 is a view partly in perspective and partly in section illustrating a portion of the sealing head of my machine.

Figure 3 is a view partly in section and partly in side elevation of the structure illustrated in Figure 2 and showing a cap in association therewith.

Figure 4 is a vertical transverse section taken through the sealing head, illustrating the upper end of a container and its cooperating cap in association with the sealing head.

Figure 7 is a vertical longitudinal sectional view showing the means for lifting the container into contact with the sealing head.

Figure 8 is a vertical transverse sectional view taken substantially along line 8—8 of Figure 7.

Figure 9 is a view partly in section but mainly in side elevation illustrating the cap feeding and applying unit of my machine.

Figure 10 is an end view of the structure illustrated in Figure 9.

Figure 11 is a view mainly in plan but partly in horizontal section of the structure illustrated in Figure 9.

Figure 12 is a view partly in perspective and partly in section of the cap feeding mechanism.

Figures 5, 6:
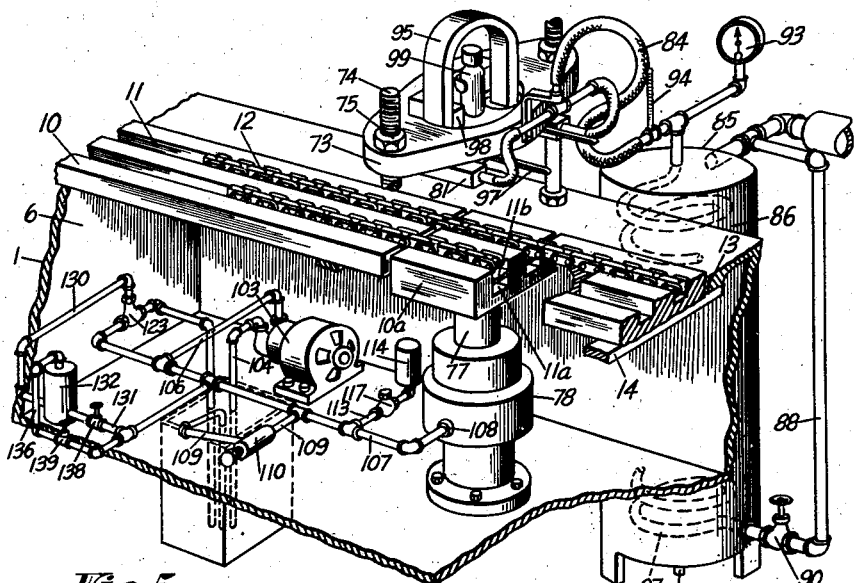
Figure 5 is a perspective view, partly broken away, of my machine illustrating most of the operating mechanism thereof.
Figure 6 is a diagrammatic view of the operating mechanism of my machine.

With reference to the drawings, I have illustrated a machine which I preferably use in performing my invention and which comprises generally a table 1 supporting a horizontal conveyer unit 2 on its upper end, a cap feeding and applying unit 3, and a sealing head unit 4. All of these units will be described in detail hereinafter.

The table 1 may be made of steel plates and comprises supporting legs 5 and an upper housing portion 6. The top of the housing is formed by the top plate 7 of the table. A removable plate 8 is provided at the side of the housing in order to permit access to the interior thereof which is adapted to contain most of the operating mechanism of the machine. At each end of the housing adjacent to the top of the table a pair of outwardly projecting supporting beam members 9 are provided. These beam members have their inner ends suitably secured to table 1. The upper edges of the members 9 are flush with the top plate 7 of the table. The members 9 are adapted to support the conveyer unit 2.

The conveyer unit 2 comprises a longitudinally extending plate 10 (Figures 1 and 5) which is provided with a pair of longitudinally extending grooves 11 which are parallel with each other and which are adapted to receive the parallel chains 12 of the conveyor. The plate 10 extends from one end of the machine to the other between the beam members 9 and through a channel 13 in the top 7 of the table. The plate 10 is supported by transverse bars 14 (Figures 5, 7 and 8) secured to the lower surface of the top 7 of the table and to the beam members 9. The top surface of the plate 10 is substantially flush with the top surface of the table 7 and with the upper edges of the beams 9.

The chains 12 are endless sprocket chains and pass around a pair of driving sprockets 15 at one end of the machine and a pair of idler sprockets 16 at the other end of the machine. The sprockets 15 are keyed on a horizontal transverse shaft 17 rotatably mounted in the ends of the pair of beams 9 at that end of the machine. The sprockets 16 are keyed on a horizontal transverse shaft 18 rotatably supported in the ends of the beams 9 at that end of the machine. The shaft 17 is driven by an electric motor 19 through a speed reduction gear unit 20, both of which are supported by one of the beams 9 adjacent to the outer end thereof. The conveyer is normally driven continuously by the motor 19. The chains will pass through the grooves 11 formed in the plate 10. As indicated in Figures 1, 5 and 8, the top edge of each chain 12 will project slightly above the top surfaces of the plate 10. Thus, articles placed on the conveyer will be supported by the pair of chains 12 which are closely adjacent to each other and the bottom of the articles will not contact with the upper surfaces of the plate 10. Furthermore, the upper flights of the chains will slide along the bottoms of the grooves 11 formed in the plate 10. The lower flights of the chains 12 will pass beneath the plate 10 and through an opening 21 formed in each end of the housing 6.

As indicated in Figure 1, the containers 22 are placed indiscriminately on the conveyer and are moved in the direction of the arrow by the conveyer. My invention is not limited to any particular type of container and cooperating cap but for illustrative purposes I have shown a container which has at its upper end a reduced portion 23 adapted to receive a cap 24 (Figure 4). This cap preferably embodies a substantially disk-like portion 25 which has a depending annular skirt 26 which carries an annular gasket 27 therewithin. When the cap is forced downwardly onto the reduced portion 23, the frictional contact of the gasket with the reduced portion of the container will aid in maintaining the cap in position and will seal the cap on the container.

In order to center the containers transversely of the conveyer and to maintain them centered, I provide a pair of longitudinally extending guide rails 28. Each guide rail 28 is supported adjacent one edge of the conveyer by means of a plurality of longitudinally spaced vertical supports 29. Each support 29 carries at its upper end a transversely adjustable pin 30 which is connected to the rail 28. Each pin 30 is held in adjusted position by set-screw 30a. Thus, it will be apparent that the guide rails 28 may be adjusted towards and from each other to compensate for differences in sizes of the containers upon which this machine may operate. At the end of the machine where the containers first enter between the guide rails, these rails are flared outwardly as indicated at 31. Thus, these guide rails will center the containers on the conveyer as they are moved between the rails and will maintain them centered on the conveyer during the various operations performed by the machine.

After the containers are positioned on the conveyer, they are first carried to the cap feeding and applying unit 3. This cap feeding and applying unit is illustrated best in Figures 1 and 9 to 12 inclusive. The cap feeding and applying unit comprises a cap receiving magazine for receiving a stack of nested caps which is formed by four upstanding posts 32 supported on a horizontally disposed cap feeding device 33. This device 33 is carried by a vertically disposed slide 34 operating in a vertically disposed guide member 35. The guide member 35 is carried by a horizontal support 36 at one side of the conveyer. A vertically disposed screw member 37 is supported by the member 35 and is threaded through the slide 34. By operating hand wheel 38 keyed on the upper end of screw member 37, the slide 34 may be raised or lowered so that the device 33 can be adjusted to different heights depending upon the height of the containers to be operated upon by the machine. The slide 34 also carries a bolt 35a which extends into a vertical slot formed in member 35. This bolt may be tightened to hold member 34 in any adjusted position. The vertical supporting member 35 is bolted to the horizontal support 36 by means of bolts 39 which extend into slots formed in the member 36 and disposed transversely of the conveyer. This permits the member 35 to be adjusted laterally relative to the conveyer. Thus, the device 33 may be adjusted both vertically and laterally relative to the conveyer to properly position it relative to the containers on the conveyer.

The device 33 is preferably of the construction indicated in Figures 9 to 12. It consists of a member 40 which has an annular socket portion 41 that receives and retains an annular collar 42. The collar 42 forms the lower part of the cap magazine and is retained in position by means of bolts 43. The collar member 42 may be removed and replaced with a different member having a central opening 44 of a different size depending upon the size of the caps to be applied to the containers. The upper end of the opening or central socket 44 is flared, as indicated at 45, to facilitate dropping of the caps thereinto. The posts 32 are carried by the collar member 42. These posts and the collar form the cap magazine. The member 40 carries a longitudinally reciprocable slide 46 which is disposed in a suitable guide formed therein.

This slide 46 is illustrated best in Figure 12. This slide includes a number of superimposed plates having openings therethrough and through which the caps will drop from the magazine. These plates can be removed and replaced with plates having openings of a different size to permit caps of a different size to pass therethrough. Thus, the slide is provided with a top plate 47 having an opening therein through which the caps in the magazine will drop. With the slide in the position indicated in Figure 9, the lowermost cap in the magazine will rest on an inwardly projecting cap separator 48 which is disposed directly below the plate 47. This separator 48 has a sharp forward edge 49. Spaced a distance slightly greater than the thickness of a cap below the separator 48 is a plate 50. This plate has an opening 51 through which the caps will drop after being removed from the separator 48 in the manner to be described. Spaced a similar distance below the plate 50 is a shelf 52 which terminates at the point 53 spaced from one edge of the opening 51 in plate 50. Extending from the lower side of the slide is the bottom member 54 of the cap chute. This member extends downwardly and then horizontally. It is provided with a narrow tongue 55 at its forward edge. A pivoted gate 56 hangs freely adjacent to the forward edge of the tongue 55. This gate has its upper end pivoted at 57 to vetrically disposed side plates 58 which form the sides of the cap chute. These side plates 58 are attached to horizontal members 59 which are bolted to the member 40. The member 42 carries a pin 60 which extends downwardly almost into contact with the plate 50. The member 42 also carries a similar pin 61 at a point on the opposite side of the opening 44. This pin projects downwardly through aligning slots formed in the plates 47, 50 and 52.

In the operation of this mechanism, the slide 46 is adapted to be reciprocated intermittently. The caps in the magazine are superimposed and the lowermost cap will rest on the separator 48 when the slide is in the position illustrated in Figure 9. As soon as the slide 46 is withdrawn to the right (Figure 9), the cap resting on the separator 48 will contact with the pin 61 and the separator 48 will be withdrawn from beneath the cap allowing it to drop on the forward portion of the plate 50. When the slide is moved back to its initial position, the separator 48 engages the next cap. The sharp edge 49 separates the stack from the cap to be dropped. At the same time the cap which rests on the plate 50 will engage the pin 60 and will drop through the opening 51 onto the member 52. The next outward movement of the slide will cause the cap resting on member 52, in the manner illustrated in Figure 9, to engage pin 61 and the member 52 will be withdrawn from beneath the cap. This will cause the cap to drop down onto the member 54. It will slide down member 54 and will hang over the forward end of tongue 55 but will be retained on the member 54 by the gate 56, as indicated in Figure 9. In the meantime, during the reciprocation of the slide, another cap will be moving into the positions previously occupied by the first mentioned cap. A container carried by the moving conveyer will engage the skirt of the cap causing it to be withdrawn from the chute and swinging the gate 56 about its pivot. Each time the slide is reciprocated a cap will be withdrawn from the magazine and a cap will be deposited in the cap chute.

I provide means for automatically reciprocating the slide 46. This means comprises a lever 62 which is keyed at its upper end to a horizontally disposed shaft 63 rotatably mounted in a bearing or sleeve 64 supported by the member 35. The lower end of this lever is pivotally connected to a link 65 which is pivoted to the outer end of the slide 46. A second lever 66 is pivoted to the opposite end of the shaft 63. This lever is also pivoted at 67 to a member 67a which is adjustably threaded on the upper end of a rod 68. The lower end of this rod is pivotally connected to the core 69 of a solenoid 70. The solenoid 70 is supported on the horizontal support 36 which carries member 35. The solenoid is such that each time it is energized, the slide 46 will be withdrawn and then returned to its original position.

The solenoid is energized each time a container engages a cap and withdraws it from the chute which causes the gate 56 to be swung about its pivot. To acomplish this the gate 56 carries a mercury switch 71 which is connected by wires 72 to the solenoid. This switch is so arranged that when the gate 56 is swung outwardly and upwardly by withdrawing a cap from the chute, the switch makes contact and energizes the solenoid. When the solenoid is energized, the rod 68 is pulled downwardly, swinging lever 66 downwardly, rotating shaft 63, swinging lever 62 outwardly and drawing the slide 46 outwardly. When the gate 56 drops back to its original position, the switch 71 breaks the circuit, and the solenoid is de-energized. A spring 69a may be provided in the solenoid for forcing the core 69 upwardly to cause the slide 46 to be returned to its original position. The effective length of the rod 68 is adjustable by adjusting member 67a therealong to permit vertical adjustment of member 34 on member 35.

After the containers pass the unit 3, where the caps are loosely applied thereto, they pass to the sealing head unit 4. This unit is adapted to seal the caps on the containers and to vacuumize and sterilize the head space and sterilize the cap before the sealing operation. This sealing head unit 4 is illustrated best in Figures 1 to 7 inclusive. It comprises a transversely extending plate 73 of non-magnetic metal which is supported on a pair of posts 74, one of which is disposed at each side of the conveyer, which are supported by the upper plate 7 of the table 1. The posts 74 are threaded and a pair of spaced nuts 75 on each post hold the plate 73 in the desired vertical position. It will be apparent that the plate 73 may be adjusted so that it will be at the proper height depending upon the height of the containers to be sealed.

In order to seal the caps on the containers, when each container moves beneath the sealing plate 73, the container is raised until the cap contacts with the lower surface of plate 73 and the cap is forced downwardly over the mouth of the container. To accomplish this I provide means directly below the sealing plate 73 for raising the container from the conveyer and causing the cap thereon to engage plate 73. Thus, it will be noted from Figures 1, 5 and 7 that the plate 10 is provided with a movable section 10a directly below the plate 73. This section 10a is slightly different from the main sections of the plate. The grooves 11a therein are deeper (Figure 8) and bars 11b are provided in the grooves and normally rest on recessed portions 76 provided at the ends of grooves 11 so that the bars will be substantially flush with the bottoms of the grooves 11. The chains 12 will contact with these bars 11b.

The section 10a of the plate 10 is carried on the upper end of a piston rod 77 which extends downwardly into a vertically disposed hydraulic cylinder 78 (Figure 7). The piston rod 77 projects upwardly from a piston 79 which operates in the cylinder 78. A compression spring 80 in the upper end of cylinder 78 bears against the piston 79 and normally maintains it in its lowermost position. Hydraulic pressure is adapted to move the piston 79 upwardly. When the piston does move upwardly, the member 10a is raised and a container which is on the conveyer above this member will also be raised. The container is lifted from the continuously moving conveyer. The grooves 11a are deep enough to permit the member 10a to be raised sufficiently without contacting bars 11b to cause the cap on the container to contact plate 73 and to be forced on the mouth of the container to its final sealed position. The chains 12 will continue to move through the grooves 11a during this operation.

The lower surface of the plate 73 carries a pair of steam jets 81. These steam jets are adapted to sterilize the head space in the upper end of the container and the cap and to displace the air in head space. The members 81 are spaced apart and are so disposed that the upper end of a container moved along by the conveyer will pass between these members in the manner illustrated in Figure 4. Each member 81 has a main longitudinally extending steam passageway 82 which has an inwardly directed jet orifice 83 in the form of a slot. The steam will issue through the orifices 83 continuously. As will be explained later, I provide means for lifting each cap from the upper end of the container so that the steam can pass into the upper end thereof to perform its sterilizing and evacuating functions. The members 81 are mounted on plate 73 by bolts and slots so that they may be moved laterally relative to each other in accordance with variations in the sizes of containers sealed by my machine.

The two steam jets are connected by conduits 84 to a superheater 85 (Figure 5). The superheater 85 embodies a tank 86 and an inner coil 87. The upper end of the coil 87 is connected to the conduit 84. The lower end of the coil is connected by a pipe 88 to a high pressure main steam line 89. A valve 90 is provided in the pipe 88 and is adustable to govern the pressure of the steam flowing through the coil 87 and to the jets 81. The main steam line 89 is connected also to the upper end of the tank 86 as at 91. A drain pipe 92 is connected to the lower end of the tank 86 and is adapted to discharge the condensate. In the operation of this superheater, the steam will flow from the line 89 through pipe 88, past valve 90 into the coil 87, and then through conduit 84 to the jets 81. The pressure of this steam, which will be comparatively low, can be regulated by the valve 90. Steam will also flow from the main line 89 into the tank 86 and will fill the tank. The condensate from the steam in the tank will emerge from the lower end of the tank through pipe 92. It will be apparent that when the steam passes from the main line into the coil 87, at which time its pressure is reduced, there will be a tendency for the steam in the coil to condense. However, due to the fact that the high pressure and high temperature steam from the line 89 fills the tank 86, this condensation will be precluded because the coil will be heated by the steam in the tank above the temperature of saturation. Thus the steam applied to the upper end of the containers by the jets 81 will be dried or superheated and will serve more effectively to produce a vacuum in the upper end of the container. If desired, the conduit 84 may be provided with a pressure gauge 93 and a thermometer 94.

In order to lift each cap from the container as it passes under the sealing head 4, I provide a magnet 95 above the plate 73. This magnet 95 is of the horseshoe type and is vertically disposed above the plate 73. Its poles extend into sockets 96 formed in the upper surface of the plate 73. The sockets 96 extend almost entirely through the plate so that the poles will be more effective on a cap beneath the plate. When a container with a cap thereon moves beneath the plate 73 and the magnet, the magnetic force will cause the cap to be lifted from the container so that the steam jets can apply the steam to the interior thereof. The magnet will lift the cap and draw it upwardly into contact with the plate 73 and hold it in this position, in which position it will continue to move with the container since the neck of the container will still engage the skirt of the cap, until the container rises and engages the cap which will be sealed thereon. However, it sometimes happens that the cap applied to the upper end of the container by the unit 3 will stick thereon and it will be difficult for the magnet to lift it therefrom. To overcome this I provide a pair of spaced strips 97 which are supported by the members 81 and which extend downwardly and rearwardly at an angle. As indicated in Figure 3, these members are spaced laterally apart sufficiently to engage the lower edge of the cap skirt at diametrically opposed points. They will engage the cap just shortly before it comes beneath the plate 73 and the cap will move off these members just before it moves beneath the magnet 95. The members 97 will raise the cap only very slightly so that the upper end of the container will still engage the skirt of the cap and move the cap along beneath 73. The members 97 are laterally adjustable with the members 81 so that they may be made to function with caps of varying sizes.

I provide a control system for causing the container lifting mechanism to function each time a container with a cap thereon passes beneath the plate 73 and magnet 95. If it happens that the unit 3 does not apply a cap to the container so that when it moves beneath the plate 73 there is no cap thereon, this mechanism will not function to lift the container. Thus, there is no danger of the container lifting mechanism operating to lift a container not having a cap thereon and crushing the upper end of the container against plate 73.

This control system is actuated by the magnet 95 when a cap is moved beneath this magnet. It will be noted that one pole of the magnet is provided with an auxiliary pole 98 above the plate 73 which projects towards the opposite pole. Between the two poles of the magnet above the plate 73 and closely adjacent to the auxiliary pole 98 is mounted a mercury switch 99. This switch includes one contact 100 (Figures 2 and 3) which is always in the mercury 101 in the bottom of the switch. It also includes a movable spring contact 102 which normally does not extend downwardly into the mercury, as indicated in Figure 2, due to the fact that the pole 98 will exert sufficient magnetic force thereon to draw it towards this pole 98 and out of the mercury. This is true when a metal cap is not positioned under the plate 73. At this time the lines of magnetic force will pass from the auxiliary pole 98 directly across to the opposite pole. However, when a cap is positioned beneath the plate 73, the magnetic lines of force will pass downwardly from the one pole of the magnet through the cap to the other pole of the magnet. This will reduce the effect of the magnetic lines of force given off by the auxiliary pole 98. Consequently, the force exerted by this pole 98 on the spring contact 102 will not be sufficient to hold the contact 102 out of the mercury. Consequently, when a cap is beneath the magnet 95, the mercury switch 99 will be closed. As previously stated this switch is adapted to control the flow of hydraulic fluid to the cylinder 78 which controls the container lifting mechanism.

The hydraulic fluid supplying system for supplying fluid to the cylinder 78 is illustrated best in Figures 5 and 6. This mechanism is enclosed in the housing 6 of the table 1. It comprises a combined electric motor and oil pump 103. The pump 103 has an inlet line 104 which extends into an oil sump 105. It also has an outlet line 106 connected to a pipe 107 that is connected to the lower end of cylinder 78, as at 108. A pipe 109 leads from the pipe 107 back to the sump 105. This pipe has interposed therein an overload relief valve 110. This valve is normally held in closed position by a spring 111 to prevent flow of fluid from line 107 through line 109 to the sump. However, if the pressure in the system exceeds a predetermined amount, the valve will automatically open. The valve may be adjusted to open at different pressures by means of the screw 112.

A pipe 113 is also connected to the pipe 107 adjacent to cylinder 78. This pipe 113 leads to a pressure switch 114. This switch includes a bellows 115 to which the pipe 113 is connected. This bellows 115 is adapted to operate a contact member 116 in the form of a bellcrank lever. A spring 116a, adjustable by a screw 116b, engages the lower arm of contact 116 and normally tends to keep this contact in closed position. As will be explained later, the switch 114 is adapted to control the mercury switch 99. In the line 113 there is interposed a check valve 117. This valve includes a passageway under the control of a ball check valve 118. The ball is held on its seat under slight pressure by means of spring 118a and the force exerted by this spring may be varied by means of the adjustable nut 119. The pressure in the line 113 under normal conditions will unseat the valve 118 allowing the fluid to flow up into the bellows 115. However, the switch 116 will not be opened until the pressure in the line 113 exceeds a predetermined amount sufficient to overcome the resistance of spring 116a. A small return by-pass opening 120 is provided in valve 117 to permit the fluid to slowly return to the pipe 107 when the pressure in line 113 falls below the predetermined amount, the fluid being forced through opening 120 by contraction of the bellows. This permits the contact member 116 to return to its initial closed position slowly. The function of the check valve 117 is only to delay the reclosing of the pressure switch 114 until the piston 79 has returned to its original lower position after being forced upwardly in a manner which will be described later.

Another pipe 121 leads from the pipe 107. This pipe is connected to the inlet 122 of a pilot operated control valve 123. The outlet 124 of this valve is connected to a pipe 125 which leads to the sump 105. The valve 123 has a passageway 126 connecting the inlet 122 with the outlet 124. This passageway is under the control of a valve member 127 seating on a seat 128. The member 127 is carried by a piston 129 which is normally held in its uppermost position by fluid entering the valve 123 through line 121. However, under some conditions, it will be closed by fluid entering through line 130 into the upper end of the valve. A light spring 129a aids in this closing action and tends to keep member 127 seated. Thus the valve 123 is such that normally fluid will flow from the line 121 to the line 125. However, if member 127 is seated, the fluid will not flow from line 121 to line 125. The piston 129 is provided with a passage 130a extending therethrough which permits fluid to drain from line 130 into line 121 under a certain condition.

The line 107 is connected to the inlet 131 of a normally closed solenoid valve 132. The line 130 is connected to the outlet 133 of this valve 132. A valve seat 134 is provided in this valve and the lower end of the core 135 of the solenoid normally is seated thereon. A branch line 136 leads from the pipe 107 to the upper end of the valve 132 and supplies fluid to a small chamber 137 above the core 135. A manually adjustable valve 138 is provided in line 107 adjacent to valve 132 and a similar valve 139 is provided in line 136 adjacent to the valve 132.

The mercury switch 99, the pressure relief switch 114 and the solenoid valve 132 are in series in an electric circuit indicated generally by the numeral 140 in Figure 6. The motor 103 and motor 19 are also connected in this circuit.

When there is no container under the plate 73 or when the container under the plate has no metal cap thereon, the mercury switch 99 will be open, as previously indicated. Under these conditions the solenoid valve 132 will be closed. The valve 123 will be open, but the valve 117 and the valve 110 will also be closed. Therefore, the pump 102 will draw fluid from the sump 105 through line 104, force it through line 106, into line 107, through line 121, through valve 123, through line 125 back to the sump 105. Of course, the fluid will also flow to the cylinder 78, through line 113 to valve 117, through line 107 into the valve 132, and through line 109 to valve 110. However, because free circulation of the fluid back to the sump is permitted, the fluid in the system will have insufficient pressure to actuate these various members. Under these conditions the fluid will follow the path indicated by the full line arrows in Figure 6.

When a container with a metal cap thereon passes beneath the plate 73, the mercury switch 99 will close, as previously explained. At this time the switch 114 will also be closed. This will energize the solenoid of the solenoid valve 132. It will draw the core 135 upwardly opening the solenoid valve. The flow of hydraulic fluid will then occur in the manner indicated by the dotted line arrows in Figure 6. That is, the pump 103 will draw fluid from the sump through line 104, will force this fluid through line 106 and into line 107, through valve 132, through line 130 into valve 123 and will cause member 127 to be seated closing this valve. Therefore, return of the fluid to the sump through line 125 will be precluded. This will cause the pressure in the line 107 to be built up and cause additional fluid to enter the cylinder 78 forcing the piston 79 thereof upwardly. Also this pressure will act through the line 113 and valve 117 and on the bellows 115, causing it to expand and opening switch 114. This will break the circuit to the switch 99 and to the solenoid 132 allowing these members to return to their initial condition. However, this will not happen until after the piston 79 has been forced upwardly to the desired extent. Deenergizing the solenoid permits the valve 132 to close, the valve 123 to be opened, the ball 118 of valve 117 to be seated, and the piston 79 to fall back to its lowermost position. The bellows 115 will slowly return to its original position, allowing the contact 116 to move into its original position to close switch 114. Valve 117 will delay closing of switch 114 until piston 79 returns to its lower position. All of these operations will occur almost instantaneously. The opening 130a in piston 130 will permit fluid to drain slowly from line 130 so that valve 123 can be opened. The only time the valve 110 will open will be when excessive pressure is generated within the hydraulic system. For example, this may occur when a container is being sealed which is of slightly greater height than the container for which the machine is set. It is well known that glass containers which are all supposed to be of the same height vary to a limited degree due to manufacturing difficulties. Under such a condition the valve 110 will open relieving the pressure in the system and preventing crushing of the container.

From the preceding description the operation of the entire machine will be well understood. The conveyer will be continuously driven and the sealing head unit 4 and the cap feeding and applying unit 3 will be properly adjusted to accommodate the containers and caps to be used. The containers will be placed indiscriminately on the conveyer which will move them between the guides 28 so that they will be in alignment with the lower end of the cap chute. The containers will then be moved along and as they pass beneath the cap chute will withdraw caps therefrom as previously described. The containers with the caps loosely thereon will then be moved beneath the sealing head unit. Each time a container with a metal cap thereon moves beneath this unit, the hydraulic system will be automatically actuated to raise the member 10a, lifting the container from the conveyer and causing the cap, which has been previously drawn up into contact with plate 73, to be sealed on the upper end of the container. During the time the member 10a is lifted it will engage the next container on the conveyer, if the conveyer tends to move it under the sealing head, and will interrupt movement of this container thereby preventing two containers from being under the sealing head at the same time. Before this sealing operation occurs the upper end of the container and the cap are sterilized and the air in the upper end of the container is displaced by steam. This is accomplished by the steam jets 81. As previously described when the container with a cap thereon reaches the plate 73, the cap is lifted therefrom in the manner illustrated in Figure 4, allowing the steam to enter into the upper end of the container. The steam is preferably at a low velocity so as not to entrain air.

In sealing the cap on the container, forcing of the rubber gasket over the upper end of the container in itself serves to hold the cap on the container. However, the condensation of the steam trapped in the head space in the container beneath the cap, which occurs immediately, produces a partial vacuum which is the main force serving to hold the cap on the jar and which also aids in preventing spoilage of the contents of the container. The sealing occurs substantially simultaneously with the injection of the steam into the container and, consequently, the steam will not have much chance of escaping from the container before it is sealed. Immediately after the sealing action, the container is lowered until it again rests on the continuously moving conveyer and is moved away from the sealing position. As previously stated the container lifting mechanism will not function if a container which has no cap thereon passes therebeneath. Also excessive sealing pressure will be prevented if a container of unusual height is encountered. This will prevent crushing of the container.

It will be apparent from the above description that I have provided a greatly simplified apparatus for applying and sealing closures on containers. The caps are first positioned on the containers loosely, are then lifted and the upper portion of the containers vacuumized and sterilized and simultaneously the caps are sterilized, and then the caps are forced into sealing engagement with the container. The containers will be vacuumized and sealed quickly and effectively. The machine is very simple and can be built at a comparatively low cost. It can be adjusted readily to operate upon containers of various sizes.

Many other advantages will be apparent from the preceding description, the drawings and the following claims.

Having thus described my invention, what I claim is:

1. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, means associated with the sealing head unit for lifting the cap slightly from the container and injecting steam into the container before the cap is forced thereon, and control means actuated by said last-named means for controlling operation of said means for lifting the container.

2. Apparatus of the type described comprising a continuously moving conveyer for supporting containers which have caps loosely resting on the upper ends thereof, a sealing head unit disposed above the conveyer, means for producing relative movement between each container and the sealing head unit to force the cap on the container, means associated with the sealing head unit for lifting the cap slightly from the container and displacing the air from the container before the cap is forced thereon, and control means actuated by said last-named means for controlling operation of said means for producing relative movement between the container and sealing head.

3. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, means associated with the sealing head unit for lifting the cap slightly from the container, and for displacing air from the container before the cap is forced thereon, and a control means actuated by said means for lifting the cap for controlling operation of said means for lifting the container.

4. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container, means associated with the sealing head unit for forcing steam into the container while the cap is lifted therefrom, said last-named means and said magnet functioning before the cap is forced on the container, and control means actuated by said magnet for controlling operation of said means for lifting the container from the conveyer.

5. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container prior to the time it is forced thereon, said means for lifting the container from the conveyer comprising a vertically movable container support associated with the conveyer, means for moving said support vertically, and control means actuated by said magnet for controlling operation of said last-named means.

6. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container prior to the time it is forced thereon, said means for lifting the container from the conveyer comprising a vertically movable container support associated with the conveyer directly below said sealing head unit, hydraulic means for moving said support vertically, and control means actuated by said magnet for controlling operation of said last-named means.

7. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container, means associated with the sealing head unit for forcing steam into the container while the cap is lifted therefrom, said last-named means and said magnet functioning before the cap is forced on the container, said means for lifting the container from the conveyer comprising a vertically movable container support associated with the conveyer directly below said sealing head unit, a hydraulic cylinder and piston unit for moving said support vertically, a valve for controlling supply of fluid to said cylinder and piston unit, and an electric control circuit actuated by said magnet for controlling said valve.

8. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container, means associated with the sealing head unit for forcing steam into the container while the cap is lifted therefrom, said last-named means and said magnet functioning before the cap is forced on the container, said means for lifting the container from the conveyer comprising a vertically movable container support associated with the conveyer directly below said sealing head unit, a hydraulic cylinder and piston unit for moving said support vertically, and a solenoid-operated valve for controlling supply of fluid to said cylinder and piston unit, said magnet and said solenoid being connected in an electric circuit so that said valve is under the control of said magnet.

9. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container, means associated with the sealing head unit for forcing steam into the container while the cap is lifted therefrom, said last-named means and said magnet functioning before the cap is forced on the container, said means for lifting the container from the conveyer comprising a vertically movable container support associated with the conveyer directly below said sealing head unit, a hydraulic cylinder and piston unit for moving said support vertically, a solenoid operated valve for controlling supply of fluid to said cylinder and piston unit, said magnet and said solenoid being connected in an electric circuit so that said valve is under the control of said magnet, and a pressure relief valve associated with said cylinder and piston unit for preventing said unit from exerting a pressure on said container in excess of a predetermined amount.

10. Apparatus of the type described comprising a continuously moving conveyer for supporting containers which have caps loosely resting on the upper ends thereof, a sealing head unit disposed above the conveyer, means for lifting each container from the conveyer into contact with the sealing head unit to force the cap on the container and for then lowering the capped container onto the continuously moving conveyer, a magnet associated with the sealing head unit for lifting the cap slightly from the container, means associated with the sealing head unit for forcing steam into the container while the cap is lifted therefrom, said last-named means and said magnet functioning before the cap is forced on the container, said means for lifting the container from the conveyer comprising a vertically movable container support associated with the conveyer directly below said sealing head unit, a hydraulic system including a cylinder and piston unit for moving said support vertically, a solenoid-operated valve for controlling supply of fluid to said cylinder and piston unit, said magnet and said solenoid being connected in an electric circuit so that said valve is under the control of said magnet, a pressure relief valve associated with said cylinder and piston unit for preventing said unit from exerting a pressure on said container in excess of a predetermined amount, a switch connected in said electric circuit, said switch being operated by pressure in the hydraulic system to break the circuit in which said magnet and solenoid are connected after said cylinder and piston unit operate to lift the container, said switch being of such a nature that it will slowly return to its closed position.

11. In a machine of the type described, a sealing head unit for forcing caps onto containers, means for moving a container with a cap loosely thereon into association with said unit, a magnet associated with the sealing head unit for holding a cap lifted from the container in a raised position, means associated with the sealing head unit for engaging the cap and lifting it slightly therefrom before said magnet acts on such cap, and means for forcing steam into the upper end of the container while the cap is lifted therefrom.

12. Apparatus of the type described comprising a conveyer for supporting the containers, means for continuously moving the conveyer, a cap applying unit disposed in association with the conveyer for positioning skirted caps loosely on the upper ends of the containers as they are moved past said unit, a sealing head unit disposed in superimposed relationship to said conveyer, said sealing head unit embodying a sealing head proper having a magnet associated therewith for holding a cap lifted from the upper edge of the container in raised position, means associated with the sealing head unit for engaging the cap and lifting it slightly therefrom before said magnet acts on the cap, said means for lifting the cap and said magnet serving to hold the cap in such position that the skirt of the cap will still be engaged by the container so that the cap will move along with the container as it is moved by the conveyer, means for injecting steam into the upper end of the container while the cap is spaced from the container, and means for lifting the container into association with the sealing head to force the cap into position on the container and then to lower the container on the continuously moving conveyer.

13. Apparatus of the type described comprising a conveyer for supporting the containers, means for continuously moving the conveyer, a cap applying unit disposed in association with the conveyer for positioning skirted caps loosely on the upper ends of the containers as they are moved past said unit, a sealing head unit disposed in superimposed relationship to said conveyer, said sealing head unit embodying a sealing head proper having a magnet associated therewith for holding a cap in spaced relationship to the upper edge of the container, said magnet serving to hold the cap in such position that the skirt of the cap will still extend downwardly beyond the upper edge of the container, means for injecting steam into the upper end of the container while the cap is spaced from the container, and means for lifting the container into association with the sealing head to force the cap into position on the container and then to lower the container onto the continuously moving conveyer.

14. Apparatus of the type described comprising a conveyer for supporting containers which have skirted caps loosely applied to the upper ends thereof, a sealing head disposed in superimposed relationship to said conveyer, a magnet associated with the sealing head for holding a cap lifted from the upper edge of the container in raised position, means associated with the sealing head for engaging the cap and lifting it slightly therefrom before said magnet acts on the cap, said means for lifting the cap and said magnet serving to hold the cap in such position that the skirt of the cap will still extend downwardly beyond the upper edge of the container, means for injecting steam into the upper end of the container while the cap is spaced therefrom, and means for lifting the container into association with the sealing head to force the cap into position on the container and then to lower the container on the conveyer.

15. Apparatus of the type described comprising a conveyer for supporting containers which have skirted caps loosely applied to the upper ends thereof, a sealing head disposed in superimposed relationship to said conveyer, a magnet associated with the sealing head for holding a cap thereagainst in spaced relationship to the upper edge of the container, said sealing head being normally so disposed that the skirt of the cap will still extend downwardly beyond the upper edge of the container, means for injecting steam into the upper end of the container while the cap is spaced from the container, and means for lifting the container into association with the sealing head to force the cap into position on the container and then to lower the container onto the conveyer.

16. Apparatus of the type described comprising a conveyer for supporting containers which have skirted caps loosely applied to the upper ends thereof, a sealing head disposed in superimposed relationship to said conveyer, a magnet associated with the sealing head for holding a cap lifted from the upper edge of the container in raised position, means associated with the sealing head for engaging the cap and lifting it slightly therefrom before said magnet acts on the cap, said means for lifting the cap and said magnet serving to hold the cap in such position that the skirt of the cap will still extend downwardly beyond the upper edge of the container, means for injecting steam into the upper end of the container while the cap is spaced therefrom, and means for moving the container and the sealing head relative to each other to force the cap on the container.

17. Apparatus of the type described comprising a conveyer for supporting containers which have caps loosely applied to the upper ends thereof, a sealing head disposed in superimposed relationship to said conveyer, means associated with the sealing head for holding a cap lifted from the upper edge of the container in raised position, means associated with the sealing head for engaging the cap and lifting it slightly therefrom before said last-named means acts on the cap, means for injecting steam into the upper end of the container while the cap is spaced therefrom, and means for moving the container and the sealing head relative to each other to force the cap on the container.

18. Apparatus of the type described comprising a support for a container which has a cap positioned loosely on the upper end thereof, a sealing head disposed above the support, means for moving said container and the sealing head relative to each other to seal the cap on the container, a control unit for controlling said moving means, said control unit including means for lifting the cap from the container substantially into contact with said sealing head, and means for initiating movement of said moving means while the cap is so lifted.

19. Apparatus of the type described comprising a moving conveyer for supporting containers which have caps loosely positioned on the upper ends thereof, a sealing head disposed above the conveyer, means for interrupting movement of each successive container by the conveyer and for moving each successive container and the sealing head relative to each other in a direction axially of the container to force the cap on the container, a control unit for controlling said moving means, said control unit including means for lifting the cap from the container substantially into contact with said sealing head upon movement of the container by the conveyer into association with said sealing head, and means for initiating movement of said moving means only while the cap is so lifted.

WILLIAM D. BELL.